April 20, 1943.  C. M. HINES ET AL  2,317,133
BRAKE CONTROL MEANS
Filed Nov. 29, 1941  2 Sheets-Sheet 1

INVENTORS
CLAUDE M. HINES
DOUGLAS R. BORST
BY
A. M. Higgins
ATTORNEY

April 20, 1943.  C. M. HINES ET AL  2,317,133

BRAKE CONTROL MEANS

Filed Nov. 29, 1941  2 Sheets-Sheet 2

INVENTORS
CLAUDE M. HINES
DOUGLAS R. BORST
BY
ATTORNEY

Patented Apr. 20, 1943

2,317,133

UNITED STATES PATENT OFFICE 2,317,133

BRAKE CONTROL MEANS

Claude M. Hines, Pittsburgh, and Douglas R. Borst, Pitcairn, Pa., assignors to The Westinghouse Air Brake Company, Wilmerding, Pa., a corporation of Pennsylvania Application November 29, 1941, Serial No. 420,998

22 Claims. (Cl. 303—21)

This invention relates to brake control means for vehicles, such as railway cars and trains, and has particular relation to control means for hydraulically operated brakes including means for preventing the sliding of the wheels.

In the copending application Serial No. 372,592 of Earle S. Cook and Douglas R. Borst, filed December 31, 1940, the latter being one of the present joint applicants, there is disclosed and claimed control apparatus for hydraulically operated brakes on a multiple-unit vehicle or train, whereby the brake controlling pressure in a certain portion of a hydraulic circulatory system on each unit is varied uniformly on the different units by means of two choke means of varying relative flow capacity controlling the rate of flow of fluid into the communication and the rate of flow of fluid out of the communication.

It is an object of our present invention to provide apparatus for automatically controlling the brake control pressure in a hydraulic brake control system of the type disclosed in the above-mentioned Cook and Borst application so as to effect a rapid reduction in the degree of application of the brakes independently of the operator when the wheels slip to prevent sliding thereof.

As employed herein the terms "slip" and "slide" are not synonymous. The term "slip" or "slipping condition" refers to the rotation of a car wheel at a speed less than a speed corresponding to vehicle speed at a given instant. This condition occurs when the degree of application of the brakes associated with a wheel is such as to exceed the limit of adhesion between the wheel and road surface or rail on which the wheel rolls, thereby causing the wheels to decelerate at an abnormally rapid rate toward a locked or non-rotative condition.

The term "slide" refers solely to the dragging of a vehicle wheel along a road surface or rail in a locked or non-rotative condition.

It has been demonstrated that if the degree of application of the brakes associated with a wheel is reduced rapidly enough at the instant the wheel begins to slip, the wheel will promptly cease to decelerate and begin to accelerate back toward a speed corresponding to vehicle speed without reducing in speed to a locked condition and sliding.

Sliding of wheels is of course objectionable in that sliding produces flat spots on the wheels necessitating repair of replacement of the wheels.

The above objection of our invention, and other objects hereafter made apparent, are attained by means of control apparatus subsequently to be described in detail and shown in the accompanying drawings wherein—

Figure 1:
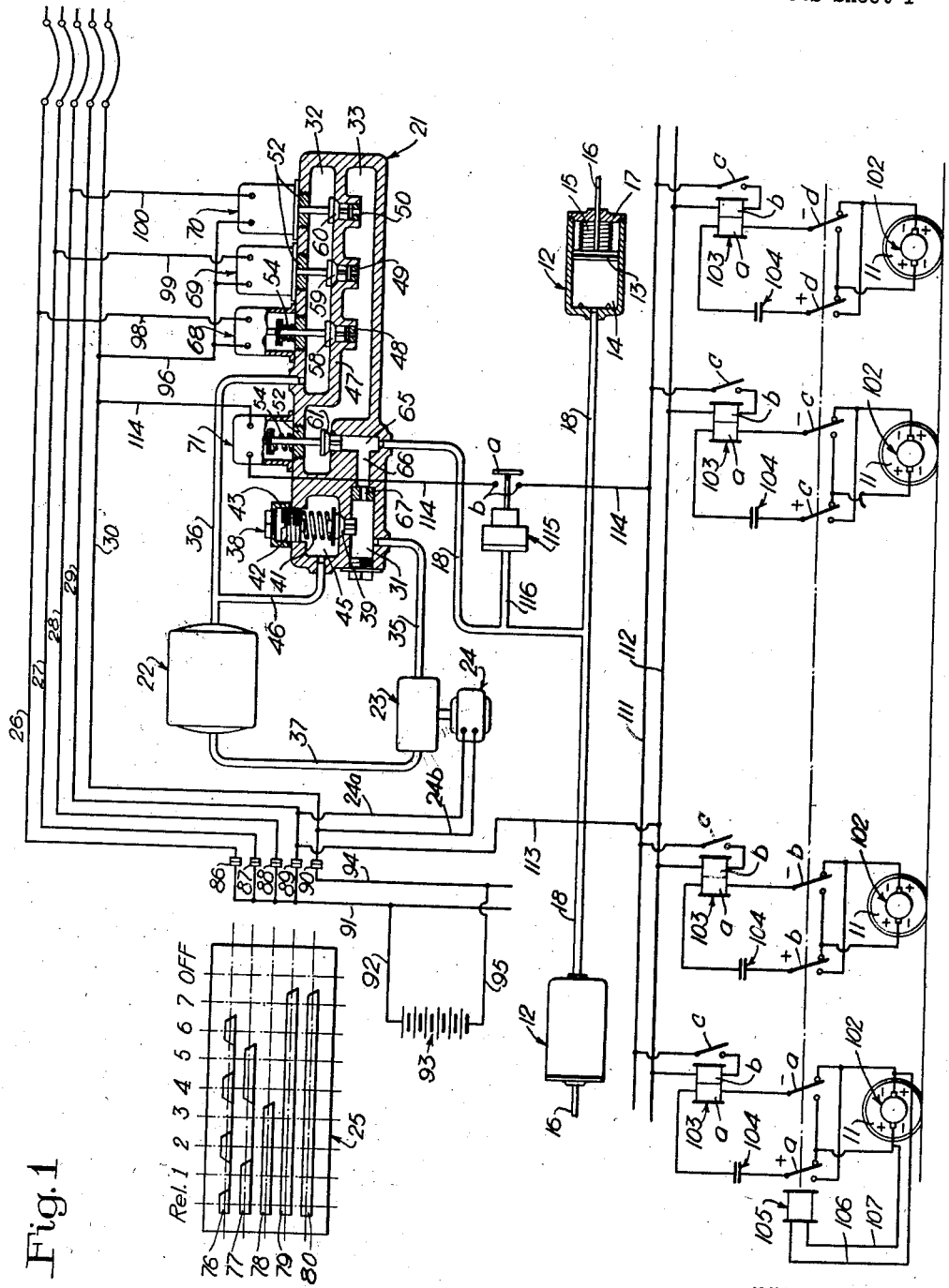
Fig. 1 is a simplified diagrammatic view, showing a control system for hydraulically operated brakes of the spring-applied pressure-released type and embodying our invention.

Description of embodiment shown in Fig. 1

Referring to Fig. 1, the control apparatus shown is that for a single car having two wheel trucks disposed at opposite ends of the car respectively. Each wheel truck comprises two wheel and axle units, each unit having two wheels fixed at opposite ends of a connecting axle. In the drawings, only one wheel of each wheel unit is shown for simplicity.

The brake apparatus for the wheels may be of any suitable type, such as the conventional clasp-arranged shoes engaging the rim of the wheel and operated through suitable brake rigging by one or more brake cylinders 12. In the drawings, only one brake cylinder 12, vertically above each wheel truck, is shown for operating the brakes of that wheel truck, but any desired number of brake cylinders may be provided for each truck.

As shown in the sectional view of one of the brake cylinders, each brake cylinder contains a piston 13 having a pressure chamber 14 at one side thereof to which a hydraulic medium or liquid, such as oil of suitable viscosity, is supplied under pressure to urge the piston in a direction to effect the release of the brakes. On the side of the piston 13 opposite the pressure chamber 14 is a coil spring 15 which is effective upon a reduction of the hydraulic pressure in the chamber 14 to force the piston 13 in a direction to effect application of the brakes to a degree varying according to the pressure in chamber 14. The piston 13 has a stem 16 which is slidable in a suitable journal formed in the non-pressure head 17 of the cylinder, and the stem is connected to levers of the brake rigging. The brake control mechanism shown in Fig. 1 is thus of the so-called pressure-released spring-applied type.

Liquid under pressure is supplied to the pressure chambers 14 of the brake cylinders through a pipe 18 having two branches, severally connected to each brake cylinder, under the control of a control valve mechanism 21.

The control valve mechanism 21 is included in a hydraulic circulatory system including a sump reservoir 22 containing a supply of liquid at a reduced pressure, preferably atmospheric pressure, a pump 23 preferably of the gear type, and an electric motor 24 for driving the pump 23. The control valve mechanism 21 is controlled by a manually operated brake control switch 25, shown in diagrammatic developed form, through the medium of a plurality of train wires 26, 27, 28, 29, and 30.

The control valve mechanism 21 comprises a suitable casing having an inlet chamber 31, an outlet chamber 32, and an intermediate chamber 33.

The inlet chamber 31 is connected by a pipe 35 to the discharge port of the pump 23. The outlet chamber 32 is connected by a pipe 36 to the sump reservoir 22, which is in turn connected by a pipe 37 to the inlet port of the pump 23.

The pressure in the inlet chamber 31 is limited to and maintained at a certain desired normal pressure, such as one hundred pounds per square inch, by a pressure release valve device 38. The pressure release valve device 38 comprises a valve 39 of the poppet type which is seated on an associated valve seat by a coil spring 41, the loading force of which on the valve 39 may be adjusted by screw 42 having a cap screw 43 for locking it in position.

When the valve 39 is unseated in response to the buildup of pressure in the inlet chamber above one hundred pounds per square inch, the excess liquid flows to a chamber 45 whence it is conducted by a pipe 46 to the return pipe 36 leading to the sump reservoir 22.

The outlet chamber 32 is separated from the intermediate chamber 33 by a wall 47 having three bores or circular openings in which choke-fittings, hereinafter referred to as chokes 48, 49, and 50 are respectively screwed or otherwise fixed.

The casing of the valve mechanism 21 is provided with suitable openings in the outer wall of the outlet chamber 32 in registry with the chokes 48, 49, and 50 through which they may be installed and removed. These openings are closed after the installation of the chokes by screw plugs 52 of brass or other suitable metal. The screw plugs 52 are suitably bored so as to serve as guides for the stems of poppet valves 58, 59, and 60 which are adapted to seat on valve seats formed on the wall 47 so as to close the openings in the wall containing the respective chokes.

The poppet valves 58, 59, and 60 constitute parts of three magnet operated valves 68, 69, and 70, respectively, which are suitably secured to the casing.

As shown in the sectional view of one of the magnet valves, a coil spring 54 is interposed between a collar fixed on the stem of each poppet valve 58, 59, and 60 and the corresponding screw plug 52, whereby to urge the valve upwardly to an unseated position. Upon energization of the magnet winding of each of the magnet valves 68, 69, and 70 a plunger 56 is urged downwardly to effect seating of the corresponding poppet valve.

Control valve mechanism 21 further comprises a magnet valve device 71 including a poppet valve 61 which is normally urged upwardly to an unseated position by a spring 54 and actuated downwardly to a seated position in response to the energization of the magnet winding thereof.

The magnet valve device 71 controls communication between a chamber 65 and the intermediate chamber 33, the chamber 65 being connected through a branch passage 66 including a choke 67 to the inlet chamber 31. The chamber 65 is connected to the pressure chambers 14 of the brake cylinders 12 by the aforementioned pipe 18.

The cross-sectional area of the orifice in each of the chokes 48, 49, 50, and 67, and accordingly the flow capacity of the chokes is different, being selected and designed on the basis of principles hereinafter to be explained.

Assuming that the valve 61 of the magnet valve 71 remains unseated, liquid is supplied from the inlet chamber 31 to the intermediate chamber 33 at a rate which is determined by the size of the orifice in the choke 67 and the pressure differential across the choke.

If all of the valves 58, 59, and 60 are seated, no liquid can flow out of the intermediate chamber 33 to the outlet chamber 32 and consequently the pressure in the intermediate chamber 33 and the chamber 65 builds-up to the pressure in the inlet chamber 31, as determined by the setting of the release valve device 38.

When one or more or all of the valves 58, 59, and 60 are unseated, fluid flows out of the intermediate chamber 33 through the corresponding chokes 48, 49, and 50 to the outlet chamber 32, whence it returns through the pipe 36 to the sump reservoir 22. The rate at which fluid flows from the intermediate chamber 33 to the outlet chamber 32 is determined according to the difference between the pressure in the intermediate chamber 33 and that in the outlet chamber 32 and the flow capacity of any one of the chokes 48, 49, and 50, or the collective flow capacity of two or more of these chokes.

When the rate of flow of fluid into the intermediate chamber 33 through the choke 67 and the rate of flow of fluid out of the chamber 33 to the outlet chamber 32 through one or more of the chokes 48, 49, and 50 are exactly equal a balanced flow condition occurs. The pressure developed in the intermediate chamber 33 varies depending upon the relation of the flow capacity of choke 67 with respect to that of the chokes 48, 49, and 50, individually and collectively.

The sizes of the orifices in the chokes 48, 49, and 50 are preferably so selected that the pressure in the intermediate chamber 33 may be varied in substantially uniform steps. Thus, assuming that the supply pressure in the inlet chamber 31 is one hundred pounds per square inch, the choke 48 is of such flow capacity that when only the corresponding valve 58 is unseated, the pressure in the intermediate chamber 33 is reduced ten pounds with respect to the supply pressure, that is, a pressure of ninety pounds is established in the chamber 33.

Choke 49 is of such flow capacity that when only the corresponding valve 59 is unseated, the pressure established in the intermediate chamber 33 is substantially eighty pounds per square inch.

When both valves 58 and 59 are simultaneously unseated while the valve 60 is seated, the combined flow capacity of the two chokes 48 and 49 acting in parallel is such as to cause a pressure of substantially seventy pounds per square inch to be established in the intermediate chamber 33.

The flow capacity of the choke 50 is such that when only the valve 60 is unseated, the pressure established in the intermediate chamber 33 is substantially sixty pounds per square inch.

When the valves 58 and 60 are both unseated, while the valve 59 is seated, the combined flow capacity of the two chokes 48 and 50 is such as to cause a pressure of substantially fifty pounds per square inch to be established in the intermediate chamber 33.

When the valves 59 and 60 are simultaneously unseated while the valve 58 is seated, the combined flow capacity of the two chokes 49 and 50 is such as to cause a pressure of substantially forty pounds per square inch to be established in the intermediate chamber 33.

When all of the valves 58, 59, and 60 are simultaneously unseated, the combined flow capacity of chokes 48, 49, and 50 is such as to cause a pressure of substantially thirty pounds per square inch to be established in the intermediate chamber 33.

It should be understood that the hereinbefore described arrangement of chokes 48, 49, 50, and 67 is not in itself our invention, being disclosed and claimed in the aforementioned application Serial No. 372,592 of Earle S. Cook and Douglas R. Borst.

The magnet valves 68, 69, and 70 are selectively energized and deenergized in different combinations under the control of the manually operated brake control switch 25.

The brake control switch 25 may be of any suitable type. As diagrammatically shown, however, it comprises a rotary shaft having a plurality of cams 76, 77, 78, 79, and 80 fixed thereon and effective to cause opening or closing of corresponding switches 86, 87, 88, 89, and 90, respectively, depending upon the rotary position of the cams. A suitable operating handle (not shown) is provided for rotating the shaft being adapted in well known manner to be removed only in the "off" position.

As shown, the cams 76 to 80 have nine different positions designated, respectively, Release, 1, 2, 3, 4, 5, 6, 7, and Off.

In accordance with conventional practice, each of the switches 86 to 90 are closed in those positions covered by the corresponding cam and opened in those positions not covered by the corresponding cam. Thus, with the brake control switch 25 in its "release" as shown, all of the switches 86 to 90 are closed. In position 1, only switch 86 is open, while in position 2 only switch 87 is open. The open and closed position of the switches 86 to 90 in the other positions of the brake switch may be readily determined in a similar manner, it being seen that in the off position, all of the switches 86 to 90 are open.

The switches 86, 87, 88, and 89 are effective when closed to connect train wires 26, 27, 28, and 29 respectively to a positive bus wire 91 which is connected by a wire 92 to the positive terminal of a suitable source of current, such as a storage battery 93. The switch 90 is effective, when closed, to connect train wire 30 to a negative bus wire 94 which is connected to the negative terminal of the battery 93 by a wire 95.

One terminal of the magnet winding of each of the three magnet valves 68, 69, and 70 is connected by a wire 96 to the train wire 30. The remaining terminals of the magnet windings of the magnet valves 68, 69, and 70 are respectively connected by branch wires 98, 99, and 100 to the train wires 26, 27, and 28 respectively.

It will thus be seen that in the "release" position of the brake switch 25, the magnet windings of all of the magnet valves 68, 69, and 70 are energized to effect seating of all of the valves 58, 59, and 60.

In position 1, only switch 86 is open, thus effecting deenergization of the magnet winding of magnet valve 68 and the consequent unseating of the valve 58.

In position 2, only switch 87 is open, thus effecting deenergization of the magnet winding of the magnet valve 69 and the unseating of the valve 59.

In position 3, both switch 86 and switch 87 are open, thus effecting deenergization of the magnet windings of both the magnet valves 68 and 69 and the unseating of the valves 58 and 59.

In position 4, only switch 88 is open, thus effecting deenergization of the magnet winding of the magnet valve 70 and the unseating of only the valve 60.

In position 5, switches 86 and 88 are open, thus effecting deenergization of the magnet windings of the magnet valves 68 and 70 so that only the valves 58 and 60 are unseated.

In position 6, switches 87 and 88 are open, thus effecting deenergization of the magnet windings of the magnet valves 69 and 70 so that only the valves 59 and 60 are unseated.

In position 7, all of the switches 86, 87, and 88 are open, thereby effecting deenergization of the magnet windings of all of the magnet valves 68, 69, and 70 and the consequent unseating of all of the valves 58, 59, and 60.

It will thus be seen that because the pressure in the intermediate chamber 33 is communicated through the chamber 65 and pipe 18 to the brake cylinder pressure chambers 14, a varying reduction from the normal release pressure in the brake cylinder chambers may be effected according to the position of the brake control switch 25 to effect application of the brakes associated with the vehicle wheels to a desired degree.

The terminals of motor 24 are connected by a pair of wires 24a and 24b to train wires 29 and 30 respectively. It will be seen that current is supplied to the motor 24 to cause it to drive pump 23 whenever the handle of the brake control switch 25 is installed and shifted out of Off position toward "release" position, because switches 89 and 90 are closed in all positions of the brake control switch 25 except the Off position. Conversely, the removal of the handle of brake control switch 25 in the Off position automatically opens switches 89 and 90 to cause stopping of the motor.

According to our present invention, the magnet valve 71 is provided for closing communication between chamber 65 and the intermediate chamber 33 whenever slipping of the wheels on the car occurs so that the pressure in the brake cylinder pressure chambers 14 may be restored promptly and rapidly to the normal release pressure independently of the control exercised by the operator through magnet valves 68, 69, and 70.

The magnet winding of the magnet valve 71 is normally deenergized and is energized, according to our invention, whenever slipping of a wheel unit on the car occurs.

Various types of devices may be provided for recognizing the slipping condition of a vehicle wheel. We have illustratively shown in Fig. 1 one such type of apparatus, which is electrical in character.

Associated with each wheel unit is a direct-current generator 102, the rotary armature of which is adapted to be rotated according to the rotational speed of the wheel unit as by mounting the generator on the journal casing at the end of an axle and coupling the armature shaft to the axle of the wheel unit. The generators 102 are preferably of the permanent magnet field type and are designed so as to provide a voltage substantially proportional to the rotational speed of corresponding wheel units.

Associated with each generator 102 is a relay 103, hereinafter designated the slip relay, and an electrical condenser 104.

Each of the slip relays 103 has a pick-up winding $a$, a holding winding $b$, and a single front contact $c$.

The pick-up winding $a$ of each relay 103 is connected in series relation with a condenser 104 across the terminals of the generator armature 102 through corresponding contacts $a$, $b$, $c$, and $d$ of a reversing switch 105.

The reversing switch 105 is a polarized relay having a winding connected by a pair of wires 106 and 107 across the terminals of one of the generators 102.

The polarity at the terminals of the generators 102 automatically reverses with a reversal in the direction of rotation of the wheels. The direction of flow of current through the winding of the reversing relay 105 accordingly reverses automatically upon a reversal in the direction of rotation of the wheel unit. In this application, it is assumed that the direction of flow of current through the winding of the reversing relay 105 for the forward direction of travel of the vehicle is such as to maintain the contacts of the reversing relay in their dropped-out positions in which they are shown. Conversely, it is assumed that when the vehicle travels in a reverse direction, the contacts of the reversing relay are actuated to their picked-up positions.

It will be understood that the relay 105 is of such nature that once the contacts thereof are actuated to either the dropped-out or the picked-up positions thereof they can not be moved out of such position unless the direction of current flow through the winding reverses. Accordingly, the contacts of the reversing relay 105 are maintained positively in a given position until the direction of travel of the vehicle reverses.

Thus, notwithstanding a reversal in the polarity of the voltage across the terminals of the armatures of the generators 102 with reversal in the direction of rotation of the wheels, a voltage of constant polarity is impressed across each condenser 104 and pick-up winding $a$ of the corresponding slip relay 103 associated with each generator.

Whenever the voltage supplied by each one of the generators 102 increases, a current flows through the series circuit including the condenser 104 and the winding $a$ of the corresponding slip relay 103 to charge the condenser, the charging current corresponding substantially to the rate of increase in voltage and accordingly the rate of acceleration of the wheels. Conversely, whenever the voltage delivered by a generator 102 reduces, the condenser 104 discharges causing current flow in the opposite direction in the circuit. The condenser discharge current corresponds substantially to the rate of reduction of the generator voltage which in turn corresponds to the rate of deceleration of the corresponding wheel unit.

The capacity of each condenser 104 is such and the pick-up winding $a$ of each slip relay 103 is so designed that the contact $c$ of the relay is actuated to its picked-up or closed position only in response to a current exceeding a certain value and discharged from the condenser, current flowing in the opposite direction to charge the condenser not being effective to cause pick-up of the contact of the relay or being effective to restore the contacts to the dropped-out position thereof.

As is well known, whenever a vehicle wheel begins to slip it decelerates at an abnormally rapid rate toward a locked condition. Normally, as long as a wheel is not slipping, a rate of deceleration thereof corresponding to a rate of retardation of the car of four or five miles per hour per second is not exceeded. If, therefore, the wheel decelerates rotatively at a rate corresponding to a rate of retardation of the vehicle of ten miles per hour per second, it is a positive indication that the wheel is slipping.

The pick-up winding $a$ of each slip relay 103 is so designed that the current required to cause pick-up of the contact $c$ of the relay is not established unless the wheels rotatively decelerate at a rate in excess of ten miles per hour per second, that is, unless the wheels actually begin to slip.

It should be here understood that the arrangement of an axle-driven generator, a condenser, and a relay in the above-described manner to respond only to the slipping condition of a wheel is not in itself our invention.

Associated with all of the relays 103 are a pair of bus wires 111 and 112. Whenever the contact $c$ of any of the slip relays 103 is picked-up, it connects the holding winding $b$ of the corresponding relay across the bus wires 111 and 112.

One of the bus wires, for example the bus wire 112, is connected by a wire 113 to the train wire 29. The bus wire 111 is connected by a wire 114 including the contacts of a pressure operated switch 115 and the winding of the magnet valve 71 to the train wire 30.

The pressure switch 115 is connected by a branch pipe 116 to the pipe 18 and is operatively responsive to variations of the hydraulic pressure in the brake cylinder chambers 14. The pressure switch 115 is preferably of the snap-acting type described in Patent 2,096,492 to Ellis E. Hewitt. As diagrammatically shown, the pressure switch 115 comprises a movable contact $a$ and a pair of insulated fixed contacts $b$ associated therewith. As long as the hydraulic pressure effective in the brake cylinder chambers 14 exceeds a certain value such as ninety-five pounds per square inch, the contact $a$ is actuated out of engagement with the associated contacts $b$. Whenever the hydraulic pressure in the brake cylinder chambers 14 reduces below ninety-five pounds per square inch, the movable contact $a$ is actuated into and maintained in engagement with the contacts $b$.

It will thus be seen that the contacts of the pressure switch 115 are normally open and are actuated to closed position whenever an application of the brakes is initiated because the normal pressure carried in the brake cylinder chambers 14 for effecting release of the brakes is assumed to be one hundred pounds per square inch.

With the contacts of pressure switch 115 closed, therefore, it will be seen that the pick-up of the contact of any of the slip relays 103 establishes a self-holding circuit for maintaining the holding winding b thereof and the magnet winding of the magnet valve 71 energized until such time as the contacts of pressure switch 115 open which occurs in response to the build-up of hydraulic pressure in the brake cylinder chambers 14 effected by the seating of the valve 61 of the magnet valve 71.

*Operation of equipment shown in Fig. 1*

Let it be assumed that the vehicle having the equipment shown in Fig. 1 is traveling under power with the handle of brake switch 25 in its "release" position. In such case, the motor 24 is driving pump 23 and, at the same time, the magnet windings of the magnet valves 68, 69, and 70 are all energized, as previously explained. Accordingly, the maximum pressure of one hundred pounds per square inch is established in the brake cylinder pressure chambers 14 to effect release of the brakes.

Let it now be assumed that the operator desires to apply the brakes to bring the vehicle to a stop. To do so, he first shuts off propulsion power and then operates the brake control switch 25 to a desired position, such as position 6, to effect an application of the brakes.

Accordingly, the magnet windings of the valves 69 and 70 are deenergized in position 6 of the brake control switch 25 and the pressure in the intermediate chamber 33 of the connected brake cylinder pressure chambers 14 is reduced to forty pounds per square inch. The brake operating spring 13 in the brake cylinders 12 accordingly shifts the pistons 13 to effect application of the brakes to a corresponding degree.

As long as none of the wheels on the vehicle begin to slip, no further change in the pressure established in the brake cylinder pressure chambers 14 occurs except in response to operation of the brake control switch 25.

If, when a brake application is initiated or at any time during a brake application, any of the wheels of the vehicle begin to slip, a further operation occurs which will now be described. Let it be assumed that the right-hand wheel unit of the right-hand wheel truck in Fig. 1 begins to slip when an application of the brakes is initiated or during a brake application. In such case, the contact c of the corresponding slip relay 103 is picked-up to effect energization of the magnet winding of the magnet valve 71. Valve 61 of the magnet valve 71 is accordingly seated, thereby cutting-off or closing communication between the passage 65 and the intermediate chamber 33 so as to cause the pressure in the brake cylinder pressure chambers 14 to be promptly built-up to the normal value of one hundred pounds per square inch.

It will thus be seen that whenever any of the wheels on the vehicle begin to slip, the degree of application of the brakes on the entire vehicle is promptly and rapidly reduced, thereby causing the slipping wheels to cease deceleration and begin to accelerate back toward a speed corresponding to vehicle speed without reducing in speed to a locked condition and sliding.

Whenever the pressure in the brake cylinder chambers 14 is restored above ninety-five pounds per square inch, the contacts of the pressure switch 115 are separated to interrupt the holding circuit including the winding of the magnet valve 71 and the holding winding b of the slip relay which was picked-up, thereby effecting deenergization of the magnet winding of the magnet valve 71 and a consequent restoration of the valve 61 to its unseated position as well as the drop-out of the slip relay 103 that was picked-up.

The pressure in the brake cylinder chambers 14 is thus again reduced to a value determined according to the combination of the magnet valves 68, 69, and 70 in effect. If as assumed, the magnet windings of valves 69 and 70 are deenergized, then the pressure in the brake cylinder chambers 14 is again reduced to forty pounds per square inch, thereby effecting reapplication of the brakes.

If, upon reapplication of the brakes, slipping of any of the wheel units again occurs, the magnet valve 71 is again operated to seat the valve 61 to effect a consequent release of the brakes. Thus, at no time are the wheels permitted to decelerate to a locked condition and slide.

When the vehicle comes to a complete stop, the operator may, if desired, operate the brake control switch 25 to position 7 to further increase the degree of the brake application.

It will be apparent that the windings of all of the magnet valves 68, 69, and 70 will be deenergized in position 7 of the brake control switch 25 so that the pressure in the brake cylinder chambers 14 will be reduced to thirty pounds per square inch, thus rendering the spring 15 in the brake cylinders effective to exert a correspondingly increased force of brake application.

If the operator desires to leave the car or vehicle for any length of time, as while being serviced or repaired, he shifts the handle of brake control switch 25 to its Off position in order to remove the handle. In the Off position of the brake control switch 25, the switches 89 and 90 are both opened and consequently the supply circuit to the operating motor 24 for the pump 23 is interrupted and the motor is stopped. In such case, therefore, the supply pressure in the inlet chamber 31 reduces to atmospheric pressure and consequently the pressure in the brake cylinder pressure chambers 14 reduces to atmospheric pressure. The brake applying spring 15 in each brake cylinder accordingly effects application of the brakes to a maximum degree.

When the operator of the vehicle desires to again start the vehicle, the restoration of the operating handle of the brake control switch 25 and the shifting thereof to the "release" position automatically starts the motor 24 and effects energization of the magnet windings of all of the magnet valves 68, 69, and 70 so that the pressure in the brake cylinder chambers 14 is promptly restored to the full pressure of one hundred pounds per square inch so that the brakes are correspondingly fully released.

Figure 2:
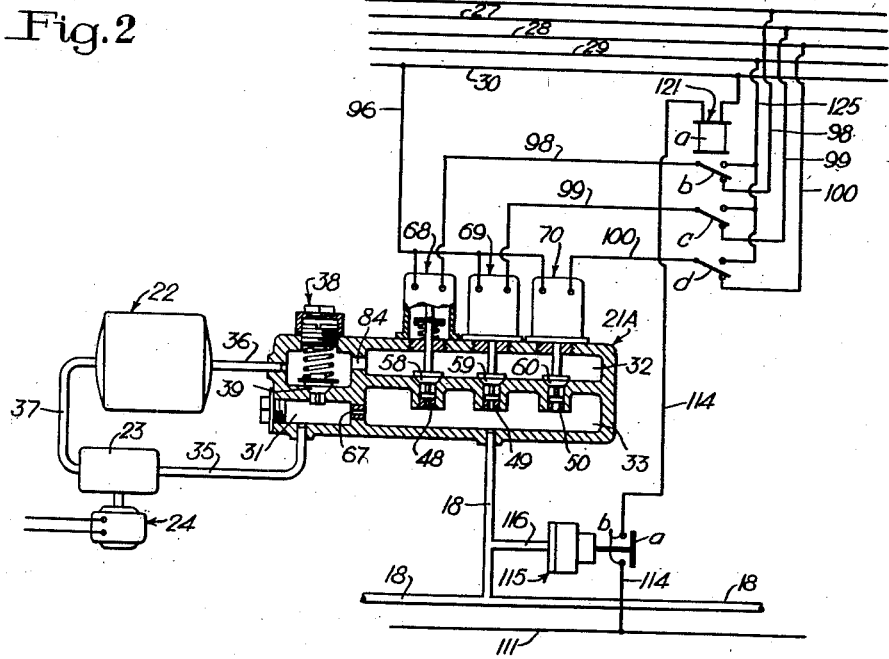
Fig. 2 is a fragmental diagrammatic view, showing a modified arrangement of the control system shown in Fig. 1.

*Embodiment shown in Fig. 2*

The embodiment shown in Fig. 2 differs from that shown in Fig. 1 essentially in the provision of a modified form of control valve 21A, which is not provided with the magnet valve 71 of control valve 21, and in the provision of a relay 121.

For simplicity, corresponding parts or elements in the two embodiments are designated by the same reference numerals without further description, it being deemed sufficient to describe only the differences in the embodiment of Fig. 2 with respect to the embodiment shown in Fig. 1.

The control valve mechanism 21A differs from the valve mechanism 21 in that communication is established from the inlet chamber 31 to the intermediate chamber 33 directly through the choke 67 and also in the fact that the outlet chamber 32 is connected through a passage 84 to the chamber 45, which is in turn connected to the sump reservoir 22 by the pipe 36.

The relay 121 is a simple relay of the neutral type having a winding $a$ and three transfer contacts $b$, $c$, and $d$.

The winding $a$ of the relay 121 is connected in series with the contacts of the pressure switch 115 in the wire 114 that connects bus wire 111 and train wire 30, in place of the magnet winding of the magnet valve 71 of Fig. 1 and relay 121 is thus correspondingly controlled so as to be picked-up whenever a wheel of the vehicle begins to slip.

When the winding $a$ of the relay 121 is deenergized, the contacts $b$, $c$, and $d$ are in their dropped-out positions in which they are effective to close the circuit through the wires 98, 99, and 100 to the train wires 26, 27, and 28. The magnet windings of the magnet valves 68, 69, and 70 are thus energized and deenergized in the same manner, as in the embodiment of Fig. 1, under the control of brake switch 25 as long as relay 121 is dropped-out.

Upon energization of the winding of the relay 121, however, the contacts $b$, $c$, and $d$ are actuated to their respective picked-up positions the connection of the magnet windings of magnet valves 68, 69, and 70 to the train wires 26, 27, and 28 is interrupted and the terminals of the magnet windings are all connected to a common wire 125 which is connected to the train wire 29.

Since the train wire 29 is connected by the switch 89 to the positive bus wire 91 in all positions of the brake control switch 25 except Off position, it will be seen that the pick-up of relay 121 effects energization of the magnet windings of all of the magnet valves 68, 69, and 70 independently of the brake application position in which the brake control switch 25 remains. Accordingly, whenever any of the slip relays 103 is picked-up in response to the slipping of the corresponding wheel unit, the valves of the magnet valves 68, 69, and 70 are all seated, thereby causing a rapid build-up of the pressure in the brake cylinder pressure chambers 14 to effect a release of the brakes. Restoration of the contacts of the relay 121 to their dropped-out positions is effected in response to the opening of the contacts of the pressure switch 115 resulting from the build-up of the pressure in the brake cylinder pressure chambers above ninety-five pounds per square inch.

Upon the drop-out of the relay 121, the magnet windings of the magnet valves 68, 69, and 70 are again energized or deenergized in accordance with the brake application position of the brake control switch 25, and the pressure in the brake cylinder chambers 14 is again reduced to a corresponding value to effect a corresponding degree of brake application.

Figure 3:
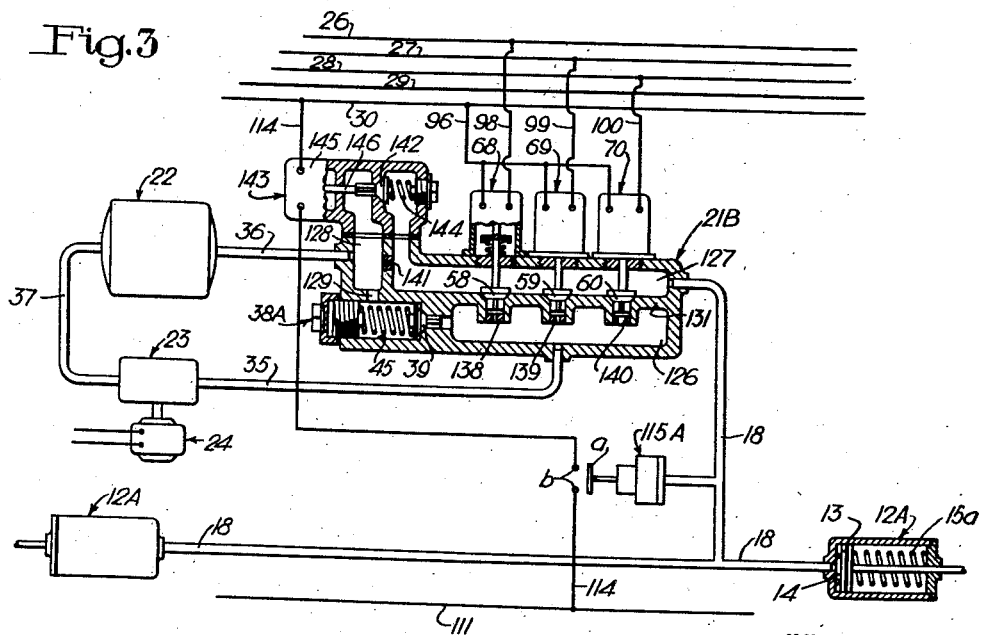
Fig. 3 is a fragmental diagrammatic view, showing a further modification of the control system shown in Fig. 1, in which the brakes are of the pressure-applied spring-released type.

*Embodiment shown in Fig. 3*

The embodiment shown in Fig. 3 differs from that in either Fig. 1 or Fig. 2 in that the brake apparatus is of the so-called pressure-applied spring-released type. In other words, brake cylinders 12A are provided in which the fluid pressure force acting in the pressure chamber 14 is effective to urge the piston 13 in a direction to effect application of the brakes, in opposition to the force of a release spring 15a.

The system shown in Fig. 3 is otherwise similar to that in Fig. 1 except for a modified form of control valve mechanism 21B and a modified form of pressure switch 115A. Accordingly, corresponding parts of Fig. 1 and Fig. 3 are designated by the same reference numerals without further description, it being deemed necessary to describe only the control valve mechanism 21B and the pressure operated switch 115A.

The control valve mechanism 21B comprises a casing having an inlet chamber 126, an intermediate chamber 127, and an outlet chamber 128.

The inlet chamber 126 is connected by pipe 35 to the discharge port of the pump 23. The intermediate chamber 127 is connected by pipe 18 to the pressure chambers 14 of the brake cylinders 12A. The outlet chamber 128 is connected by pipe 36 to the sump reservoir 22 which is in turn connected by pipe 37 to the inlet port of the pump 23.

A pressure release valve device 38A, similar to the pressure release valve device 38 of control valve mechanism 21, is provided for limiting the pressure in the inlet chamber 126 to a certain normal pressure, such as one hundred pounds per square inch. The spring-loaded valve 39 of the release valve 38A is contained in a chamber 45 which is constantly connected to the outlet chamber 128 through a port 129. Consequently, when the release valve 39 is unseated in response to pressure in excess of one hundred pounds per square inch in the inlet chamber 126, excess liquid is returned to the sump reservoir 22 past the valve 39, through the chamber 45, passage 129, outlet chamber 128 and pipe 36.

The inlet chamber 126 and the intermediate chamber 127 are separated by a wall 131 having three bores containing chokes 138, 139, and 140, respectively. Formed on the wall 131 at the intermediate chamber end of the bores containing the chokes are valve seats for poppet valves 58, 59, and 60 of magnet valves 68, 69, and 70, respectively.

The magnet windings of the magnet valves 68, 69, and 70 are controlled by a brake control switch 25 through the medium of the train wires 26, 27, 28, and 30 in exactly the same manner as in Fig. 1.

Communication between the intermediate chamber 127 and the outlet chamber 128 is established through a choke 141 and a normally seated poppet valve 142 of a magnet valve device 143.

Valve 142 is normally seated by a coil spring 144 and unseated in response to energization of a magnet winding 145 through the medium of a plunger 146 engaging the fluted stem of the value 142.

The sizes of the orifices in the chokes 138, 139, and 140 are so selected with respect to the size of the orifice in the choke 141 that different pressures are established in the intermediate chamber 127 depending upon which of the chokes 138, 139, or 140 or which combination thereof is rendered effective by the unseating of the corresponding poppet valves 58, 59, and 60.

Assuming that the normal pressure maintained in the inlet chamber 126 is one hundred pounds per square inch, choke 138 acting alone is effective to cause a pressure of, for example, ten pounds per square inch to be produced in the intermediate chamber 127. Choke 139 acting alone is effective to cause a pressure of twenty pounds per square inch to be produced in the intermediate chamber 127. Chokes 138 and 139 acting together are effective to cause a pressure of substantially thirty pounds per square inch to be produced in the intermediate chamber 127.

Choke 140 acting alone is effective to cause a pressure of forty pounds per square inch to be produced in the intermediate chamber. Chokes 138 and 140 acting together are effective to cause a pressure of fifty pounds per square inch to be produced in the intermediate chamber. Chokes 139 and 140 acting together are effective to cause a pressure of sixty pounds per square inch to be produced in the intermediate chamber 127.

When all of the chokes 138, 139, and 140 are effective, a pressure of seventy pounds per square inch is produced in the intermediate chamber 127.

It will thus be seen that since the brake cylinder pressure chambers 14 are connected to the intermediate chamber 127, the degree of application of the brakes will vary in direct proportion to the pressure in the intermediate chamber 127.

Whenever the valve 142 of the magnet valve device 143 is unseated, the rate of flow of liquid past the valve 142 to the outlet chamber 128 is so rapid in comparison to the rate of flow of fluid into the intermediate chamber 127 through the chokes 138, 139, and 140 as to effect a rapid reduction of the pressure in the intermediate chamber 127 to substantially atmospheric pressure.

According to our invention, the magnet winding 145 of the magnet valve device 143 is energized whenever one or more of the wheel units of the vehicle begins to slip. The circuit for energizing the magnet winding 145 of the magnet valve 143 is similar to that for energizing the magnet winding of the magnet valve 71 of control valve 21 in Fig. 1, extending from the bus wire 111 that is subject to the control of the slip relays 103, through a wire 114 including in series relation therein the contacts of the pressure switch 115A and the magnet winding 145 of the magnet valve 143 to the train wire 30.

The pressure switch 115A differs from the pressure switch 115 in that the movable contact $a$ thereof is normally out of contact with the associated fixed contacts $b$ as long as the pressure in the brake cylinder pressure chambers 14 is less than five pounds per square inch. When the pressure in the brake cylinder pressure chambers 14 increases above five pounds per square inch, the movable contact $a$ of the pressure switch 115A is actuated into engagement with the contacts $b$ and remains in engagement therewith until the pressure subsequently reduces below five pounds per square inch.

*Operation of embodiment shown in Fig. 3*

To effect an application of the brakes, the operator first shuts off propulsion power; if the power is on, and then shifts the brake control switch 25 to a desired brake application position. The brakes are accordingly applied to a degree depending upon the pressure established in the brake cylinder pressure chambers 14 which is, in turn, dependent upon the combination of the magnet valves 68, 69, and 70 energized or deenergized. It should be apparent from previous description that as the brake control switch 25 is progressively moved from "release" position toward position 7, the pressure in the intermediate chamber 127 of the control valve mechanism 21B is successively increased in steps of ten pounds per square inch to a maximum of seventy pounds per square inch when the brake control switch 25 is in position 7.

In the Off position of brake control switch 25, the motor 24 driving the pump 23 will be stopped and the magnet windings of the magnet valves 68, 69, and 70 will all be deenergized. Thus, the pressure in the intermediate chamber 127 of control valve 21B and consequently the pressure in brake cylinder pressure chambers 14 will be reduced to atmospheric pressure so that the brakes will be completely released. In this equipment, therefore, it is necessary to provide an additional parking brake (not shown) since the hydraulically operated brakes are ineffective in the Off position of the brake control switch 25.

If any of the wheel units begin to slip during a brake application, the pick-up of any of the slip relays 103 completes the circuit for energizing the magnet winding 145 of the magnet valve 143, it being understood that the contacts of the pressure switch 115A will be in closed position during the brake application. The pressure in the intermediate chamber 127 is thus rapidly reduced due to unseating of valve 142 to effect a corresponding rapid reduction of the pressure in the brake cylinder pressure chambers 14 and a consequent rapid reduction in the degree of application of the brakes.

The circuit for energizing the magnet winding 145 of the magnet valve 143 is maintained until the pressure in the brake cylinder pressure chambers 14 reduces below five pounds per square inch, at which time the circuit is interrupted due to the opening of the contacts of the pressure switch 115A. The valve 142 of the magnet valve device 143 is thus reseated and the pressure is again restored in the intermediate chamber 127 to effect a consequent reapplication of the brakes, the degree of reapplication depending upon which of the chokes 138, 139, and 140 or which combination thereof are effective.

The slipping wheels will be restored ordinarily back to a speed corresponding to vehicle speed before the pressure in the brake cylinder pressure chambers 14 is reduced to below five pounds per square inch so that the reapplication of the brakes on the slipping wheels is not initiated until after the wheels are fully restored to vehicle speed. The recurrence of slipping of the wheels which might occur should the brakes be reapplied before the slipping wheels are fully restored to vehicle speed is thus obviated. If slipping of the wheels again occurs upon the reapplication of the brakes, the magnet winding of the magnet valve 143 is again energized and the above operation is repeated so that at no time are the wheels permitted to decelerate to a locked condition and slide.

*Summary*

Summarizing, it will be seen that we have disclosed three embodiments of hydraulically operated brake system characterized by means responsive to the slipping of braked wheels for instantaneously and rapidly reducing the degree of application of the brakes when a braked wheel begins to slip whereby to cause restoration of the slipping wheel to vehicle speed before it can reduce in speed to a locked condition and slide.

In two embodiments, the brakes are of the pressure-released spring-applied type whereas in the third embodiment the brakes are of the pressure-applied spring-released type.

Having now described our invention, what we claim as new and desire to secure by Letters Patent, is:

1. In a vehicle brake equipment of the hydraulic type having brake means applied to different degrees and released in accordance with a hydraulic control pressure, the combination of control means operative to so control the hydraulic pressure as to effect a rapid reduction in the degree of application of the brakes associated with a wheel of the vehicle, and means responsive only to the rotative deceleration of said wheel at a rate exceeding a certain rate for effecting operation of said control means.

2. In a vehicle brake equipment of the hydraulic type having brake means applied to different degrees and released in accordance with a hydraulic control pressure, the combination of control means operative to so control the hydraulic pressure as to effect a rapid reduction in the degree of application of the brakes associated with a wheel of the vehicle, means responsive only to the rotative deceleration of said wheel at a rate exceeding a certain rate for effecting operation of said control means, and means responsive to a predetermined variation of the hydraulic control pressure for causing said control means to terminate further variation of the hydraulic control pressure to reduce the degree of application of the brakes.

3. In a vehicle brake equipment having pressure responsive means for operating the brakes associated with a wheel of the vehicle, the combination of means under the control of the operator of the vehicle for causing a variable hydraulic control pressure to be exerted on said pressure responsive means to effect the release of the brakes and the application of the brakes to different degrees, means responsive to the slipping of the said vehicle wheel, and means controlled by said wheel-slip responsive means for rendering the said operator controlled means non-effective to control the hydraulic control pressure and operative itself to so control the degree of the hydraulic pressure exerted on the pressure responsive means as to effect a reduction in the degree of application of the brakes.

4. In a vehicle brake equipment of the type having a movable abutment subject to the force of spring means urging the abutment in a direction to effect application of the brakes, the combination of means under the control of the operator of the vehicle for causing a variable hydraulic control pressure to be exerted on the abutment in opposition to the spring means to effect release of the brakes and to control the degree of application of the brakes, means responsive to the slipping of a wheel of the vehicle on which the brakes are applied, and means controlled by the wheel-slip responsive means and operative when the said wheel slips for rendering said operator-controlled means non-effective to control the hydraulic control pressure acting on said abutment and for causing an increase in the hydraulic control pressure acting on said abutment whereby to effect a corresponding reduction in the degree of application of the brakes associated with said wheel.

5. In a vehicle brake equipment of the type having a movable abutment subject to the force of spring means urging the abutment in a direction to effect application of the brakes, the combination of means under the control of the operator of the vehicle for causing a variable hydraulic control pressure to be exerted on the abutment in opposition to the spring means to effect release of the brakes and to control the degree of application of the brakes, means responsive to the slipping of a wheel of the vehicle on which the brakes are applied, means controlled by the wheel-slip responsive means and operative when the said wheel slips for rendering said operator-controlled means non-effective to control the hydraulic control pressure acting on said abutment and for causing an increase in the hydraulic control pressure acting on said abutment whereby to effect a corresponding reduction in the degree of application of the brakes associated with said wheel, and means responsive to the increase of hydraulic control pressure above a certain value as a result of the operation of the last said means for causing the last said means to terminate further increase in the hydraulic control pressure and for restoring the control of the hydraulic control pressure to said operator-controlled means.

6. In a vehicle brake equipment of the type having a movable abutment responsive to variations of fluid pressure acting thereon for controlling the release and the degree of application of the brakes associated with a wheel of the vehicle, the combination of a hydraulic circulatory system including two serially-related choke means cooperating in accordance with the relative flow capacities thereof to control the pressure in that portion of the system between said two choke means, means under the control of the operator of the vehicle for controlling the flow capacity of one of said choke means so as to effect variation of the pressure in that portion of the system between the two choke means, the pressure in the portion of the system between the two choke means being exerted on said abutment to thereby effect release and control the degree of application of the brakes in accordance with variations thereof, means responsive to the slipping of a wheel on which the brakes are applied, and means controlled by said wheel-slip responsive means for effecting a variation of the hydraulic control pressure acting on said abutment so as to effect a reduction from the degree of application of the brakes established by the said operator-controlled means.

7. In a vehicle brake control equipment of the type having an abutment subject in opposing relation to the force of spring means and fluid pressure in a manner to effect the application of the brakes to different degrees in response to the force of the spring means depending upon the force exerted by the fluid pressure, the combination of a hydraulic circulatory system including two serially-related choke means cooperating according to the relative flow capacities thereof to vary the pressure in that portion of the system between said two choke means, the pressure in the portion of the system between the choke means being the control pressure acting on said abutment, means under the control of the operator of the vehicle for controlling the flow capacity of one of said choke means in a manner to effect variation of the pressure in that portion of the system between said two choke means, means responsive to the slipping of a wheel of the vehicle on which the brakes are applied, and means controlled by said wheel-slip responsive means and operative when the wheel slips for rendering the operator-controlled means non-effective to control the flow capacity of said one choke means and for itself controlling the flow capacity of said one choke means in a manner to cause the establishment of a pressure in that portion of the system between the said two choke means resulting in a reduction in the degree of application of the brakes.

8. In a vehicle brake control equipment of the type having an abutment subject in opposing relation to the force of spring means and fluid pressure in a manner to effect the application of the brakes to different degrees in response to the force of the spring means depending upon the force exerted by the fluid pressure, the combination of a hydraulic circulatory system including two serially-related choke means cooperating according to the relative flow capacities thereof to vary the pressure in that portion of the system between said two choke means, the pressure in the portion of the system between the choke means being the control pressure acting on said abutment, means under the control of the operator of the vehicle for controlling the flow capacity of one of said choke means in a manner to effect variation of the pressure in that portion of the system between said two choke means, means responsive to the slipping of a wheel of the vehicle on which the brakes are applied, means controlled by said wheel-slip responsive means and operative when the wheel slips for rendering the operator-controlled means non-effective to control the flow capacity of said one choke means and for itself controlling the flow capacity of said one choke means in a manner to cause the establishment of a pressure in that portion of the system between the said two choke means resulting in a reduction in the degree of application of the brakes, and means responsive to the increase of the pressure acting on said abutment to above a certain pressure for restoring the control of the flow capacity of said one choke means to said operator-controlled means.

9. In a vehicle brake apparatus of the type having a movable abutment responsive to a certain fluid pressure on one side thereof for effecting release of the brakes and responsive to a reduction of such pressure for causing application of the brakes in accordance with the degree of reduction of the pressure, the combination of a hydraulic circulatory system including two serially-related choke means cooperating according to the relative flow capacities thereof to vary the pressure in that portion of the system between the two choke means, means providing a communication through which the pressure in that portion of the system between the two choke means is transmitted to said one side of the movable abutment, and means operative to effect an increase of the pressure in said communication to the one side of said abutment to effect substantial release of the brakes independently of the relation of the flow capacities of the said choke means.

10. In a vehicle brake apparatus of the type having a movable abutment responsive to a certain fluid pressure on one side thereof for effecting release of the brakes and responsive to a reduction of such pressure for causing application of the brakes in accordance with the degree of reduction of the pressure, the combination of a hydraulic circulatory system including two serially-related choke means cooperating according to the relative flow capacities thereof to vary the pressure in that portion of the system between the two choke means, means providing a communication through which the pressure in that portion of the system between the two choke means is transmitted to said one side of the movable abutment, means operative to effect an increase of the pressure in said communication to the one side of said abutment to effect substantial release of the brakes independently of the relation of the flow capacities of the said choke means, and means responsive to the slipping of a wheel on which the brakes are applied for effecting operation of the last said means.

11. In a vehicle brake apparatus of the type having a movable abutment responsive to variation of fluid pressure on one side thereof for controlling the release and the degree of application of the brakes, the combination of a hydraulic circulatory system including two serially-related choke means cooperating according to the relative flow capacities thereof to vary the pressure in that portion of the system between the two choke means, means providing a communication through which the pressure in that portion of the system between said two choke means is transmitted to said one side of the movable abutment, and means for effecting a variation of the pressure in the said communication to the one side of said abutment independently of the relation of the flow capacities of said choke means.

12. In a vehicle brake apparatus of type having a movable abutment responsive to variation of fluid pressure on one side thereof for controlling the release and the degree of application of the brakes, the combination of a hydraulic circulatory system including two serially-related choke means cooperating according to the relative flow capacities thereof to vary the pressure in that portion of the system between the two choke means, means providing a communication through which the pressure in that portion of the system between said two choke means is transmitted to said one side of the movable abutment, means responsive to the slipping of a wheel of the vehicle on which the brakes are applied, and means controlled by the wheel-slip responsive means and effective upon slipping of the wheel for effecting a variation of the pressure in the said communication to the one side of said abutment so as to effect a reduction in the degree of application of the brakes independently of the relation of the flow capacities of said choke means.

13. Vehicle brake control apparatus comprising, in combination, a hydraulic circulatory system including two serially-related choke means cooperating according to the relative flow capacities thereof to effect variation of the pressure in that portion of the system between said two choke means, manually operated means for effecting variations in the flow capacity of one of said choke means whereby to effect variation of the pressure in that portion of the system between said two choke means, pressure responsive means subject to the pressure in that portion of the system between said two choke means and responsive to variations of such pressure for controlling the degree of application and the release of the brakes associated with a wheel of the vehicle, and means operatively responsive to slipping of said wheel due to braking for so controlling the flow capacity of the said one choke means as to cause the establishment of such a pressure in that portion of the system between the two choke means as will cause a substantial reduction in the degree of application of the brakes.

14. In a control apparatus for a brake equipment of the type having a movable abutment responsive to variations of fluid pressure on one side thereof to control the degree of application and the release of the brakes associated with a wheel of the vehicle, the combination of a hydraulic circulatory system including two serially-related choke means cooperating according to the relative flow capacities thereof to effect variations of the pressure in that portion of the system between the two choke means, the pressure in that portion of the system between the two choke means acting on said abutment, means under the control of the operator of the vehicle for varying the flow capacity of one of said choke means with respect to the flow capacity of the other of said choke means whereby to effect variation of the pressure in that portion of the system between the two choke means, and normally closed valve means effective when opened to establish a communication by-passing one of said choke means whereby to effect such a variation of the pressure in that portion of the system between the two choke means as to effect a substantial reduction in the degree of application of the brakes during application thereof.

15. In a control apparatus for a brake equipment of the type having a movable abutment responsive to variations of fluid pressure on one side thereof to control the degree of application and the release of the brakes associated with a wheel of the vehicle, the combination of a hydraulic circulatory system including two serially-related choke means cooperating according to the relative flow capacities thereof to effect variations of the pressure in that portion of the system between the two choke means, the pressure in that portion of the system between the two choke means acting on said abutment, means under the control of the operator of the vehicle for varying the flow capacity of one of said choke means with respect to the flow capacity of the other of said choke means whereby to effect variation of the pressure in that portion of the system between the two choke means, normally closed valve means in parallel relation to one of said choke means effective when opened to establish a communication by-passing said choke means whereby to effect such a variation of the pressure in that portion of the communication of the system between said two choke means as to effect a reduction in the degree of application of the brakes, and means responsive to the slipping of the vehicle wheel on which the brakes are applied for causing said valve means to be opened.

16. In a control apparatus for a vehicle brake equipment of the type having a movable abutment responsive to variations of a controlling fluid pressure acting thereon to control the degree of application and the release of the brakes associated with a wheel of the vehicle, the combination of a hydraulic circulatory system including a casing having an inlet chamber to which liquid is supplied at a certain normal pressure, an outlet chamber which is maintained at a pressure less than said normal pressure, and an intermediate chamber the pressure in which is the controlling pressure for said abutment; choke means controlling the rate of flow of fluid from said inlet chamber to said intermediate chamber; a second choke means controlling the rate of flow of fluid from said intermediate chamber to said outlet chamber; said first and said second choke means cooperating according to the relative flow capacities thereof to vary the pressure in said intermediate chamber over a range between the said normal pressure established in said inlet chamber and the pressure in the outlet chamber; means under the control of the operator of the vehicle for varying the flow capacity of said second choke means so as to effect corresponding variations of the pressure in said intermediate chamber and thereby cause the release and the application of the brakes to different degrees; means responsive to the slipping of a wheel of the vehicle on which the brakes are applied; and means controlled by said wheel-slip responsive means and effective upon slipping of the wheel for preventing the flow of fluid in the system through said second choke means whereby to effect such a variation of the pressure in said intermediate chamber as to effect a substantial reduction in the degree of application of the brakes.

17. In a control apparatus for a vehicle brake equipment of the type having a movable abutment subject in opposing relation to the force of a control fluid pressure and the force of spring means, said spring means being effective to move said abutment to cause application of the brakes associated with a wheel of the vehicle in accordance with the degree of reduction of the fluid pressure below a certain pressure in which the brakes are released, the combination of a hydraulic circulatory system including a casing having an inlet chamber the pressure in which is maintained at a certain normal value, a pressure chamber, an intermediate chamber, and an outlet chamber the pressure in which is substantially atmospheric pressure; a first choke means through which fluid flows from said inlet chamber to said pressure chamber; a normally open valve controlling communication between the pressure chamber and the intermediate chamber; a second choke means through which fluid flows from said intermediate chamber to said outlet chamber; means communicating the pressure in the pressure chamber to the said abutment whereby variation of the pressure in said pressure chamber controls the degree of application and release of the brakes; said first and said second choke means cooperating according to the relative flow capacities thereof to vary the pressure in said pressure chamber and intermediate chamber when said valve is open; means under the control of the operator of the vehicle for varying the flow capacity of said second choke means whereby to vary the pressure in said pressure chamber and said intermediate chamber; and means for operating said valve to closed position whereby to cause an increase of the pressure in said pressure chamber and a consequent reduction in the degree of application of the brakes by said abutment in response to such increase in pressure.

18. In a control apparatus for a vehicle brake equipment of the type having a movable abutment subject in opposing relation to the force of a control fluid pressure and the force of spring means, said spring means being effective to move said abutment to cause application of the brakes associated with a wheel of the vehicle in accordance with the degree of reduction of the fluid pressure below a certain pressure in which the brakes are released, the combination of a hydraulic circulatory system including a casing having an inlet chamber the pressure in which is maintained at a certain normal value, a pressure chamber, an intermediate chamber, and an outlet chamber the pressure in which is substantially atmospheric pressure; a first choke means through which fluid flows from said inlet chamber to said pressure chamber; a normally open valve controlling communication between the pressure chamber and the intermediate chamber; a second choke means through which fluid flows from said intermediate chamber to said outlet chamber; means communicating the pressure in the pressure chamber to the said abutment whereby variation of the pressure in said pressure chamber controls the degree of application and the release of the brakes; said first and second choke means cooperating according to the relative flow capacities thereof to vary the pressure in said pressure chamber and intermediate chamber when said valve is open; means under the control of the operator of the vehicle for varying the flow capacity of said second choke means whereby to vary the pressure in said pressure chamber and said intermediate chamber; and means responsive to the slipping of a wheel of the vehicle on which the brakes are applied for causing operation of said valve to closed position whereby to cause an increase of the pressure in said pressure chamber and a consequent reduction in the degree of application of the brakes in response to such increase in pressure.

19. In a control apparatus for a vehicle brake equipment of the type having a movable abutment and spring means effective to exert a force on said abutment to cause application of the brakes associated with a wheel of the vehicle, said abutment being responsive to the pressure of fluid exerted in opposition to said spring means to effect a release and to control the degree of application of the brakes in accordance with the pressure of the fluid, the combination of a hydraulic circulatory system including a casing having an inlet chamber, an intermediate chamber, and an outlet chamber; means for maintaining the pressure of fluid supplied to said inlet chamber at a certain normal value while the pressure of the fluid leaving said outlet chamber is substantially less than said normal pressure; a first choke means through which fluid flows from said inlet chamber to said intermediate chamber; a plurality of parallel-related choke means through which fluid may flow from said intermediate chamber to said outlet chamber; a plurality of magnet valve devices respectively controlling the flow of fluid through said plurality of choke means; said first choke means and said plurality of choke means cooperating according to the relative flow capacities thereof to vary the pressure in said intermediate chamber; the pressure in said intermediate chamber being exerted on said abutment whereby to control the release and the degree of application of the brakes in accordance with such pressure; means under the control of the operator for selectively controlling said magnet valve devices to permit or prevent the flow of fluid through one or more of the said plurality of choke means in any one of a plurality of different combinations whereby to establish a plurality of different pressures in said intermediate chamber; and means responsive to slipping of the said wheel when braked for controlling said magnet valve devices so as to prevent the flow of fluid through all of said plurality of choke means, thereby to cause such an increase in the pressure in said intermediate chamber as to produce a substantial reduction in the degree of application of the brakes.

20. In a control apparatus for a vehicle brake equipment of the type having a movable abutment and spring means effective to exert a force on said abutment to cause application of the brakes associated with a wheel of the vehicle, said abutment being responsive to the pressure of fluid exerted in opposition to said spring means to effect a release and to control the degree of application of the brakes in accordance with the pressure of the fluid, the combination of a hydraulic circulatory system including a casing having an inlet chamber, an intermediate chamber, and an outlet chamber; means for maintaining the pressure of fluid supplied to said inlet chamber at a certain normal value while the pressure of the fluid leaving said outlet chamber is substantially less than said normal pressure; a first choke means through which fluid flows from said inlet chamber to said intermediate chamber; a plurality of parallel-related choke means through which fluid may flow from said intermediate chamber to said outlet chamber; a plurality of magnet valve devices respectively controlling the flow of fluid through said plurality of choke means; said first choke means and said plurality of choke means cooperating according to the relative flow capacities thereof to vary the pressure in said intermediate chamber; the pressure in said intermediate chamber being exerted on said abutment whereby to control the release and the degree of application of the brakes in accordance with such pressure; means under the control of the operator for selectively controlling said magnet valve devices to permit or prevent the flow of fluid through one or more of the said plurality of choke means in any one of a plurality of different combinations whereby to establish a plurality of different pressures in said intermediate chamber; means responsive to slipping of the said wheel when braked for controlling said magnet valve devices so as to prevent the flow of fluid through all of said plurality of choke means, thereby to cause such an increase in the pressure in said intermediate chamber as to produce a substantial reduction in the degree of application of the brakes, and means responsive to the increase of pressure in said intermediate chamber above a certain value for restoring control of said magnet valve devices to said operator-controlled means.

21. In a control apparatus for a vehicle brake equipment of the type having a movable abutment and spring means acting thereon to effect movement of the abutment in a direction to effect release of the brakes associated with a wheel of the vehicle, said abutment being moved in the opposite direction to exert a force proportional to the pressure of fluid acting thereon for effecting application of the brakes associated with a wheel of the vehicle to a corresponding degree, the combination of a hydraulic circulatory system including a casing having an inlet chamber, an intermediate chamber, and an outlet chamber; means for maintaining the pressure of fluid in said inlet chamber to a certain normal value while the pressure of fluid in said outlet chamber is substantially at atmospheric pressure; a plurality of parallel-related choke means through which fluid may flow from said inlet chamber to said intermediate chamber; a second choke means through which fluid may flow from said intermediate chamber to said outlet chamber; a plurality of valves respectively controlling the flow of fluid through a corresponding one of said plurality of choke means; means under the control of the operator of the vehicle for causing operation of one or more of said valves whereby to selectively control the collective flow capacity of said plurality of choke means; said plurality of choke means and said second choke means cooperating according to the relative flow capacities thereof to cause corresponding different pressures to be established in said intermediate chamber which pressure is effective on said abutment to control the degree of application and the release of the brakes; and valve means effective upon operation to establish a communication between said intermediate chamber and said outlet chamber whereby to effect a rapid reduction of the pressure in said intermediate chamber to thereby effect a rapid reduction in the degree of application of the brakes.

22. In a control apparatus for a vehicle brake equipment of the type having a movable abutment and spring means acting thereon to effect movement of the abutment in a direction to effect release of the brakes associated with a wheel of the vehicle, said abutment being moved in the opposite direction to exert a force proportional to the pressure of fluid acting thereon for effecting application of the brakes associated with a wheel of the vehicle to a correspoding degree, the combination of a hydraulic circulatory system including a casing having an inlet chamber, an intermediate chamber, and an outlet chamber; means for maintaining the pressure of fluid in said inlet chamber to a certain normal value while the pressure of fluid in said outlet chamber is substantially at atmospheric pressure; a plurality of parallel-related choke means through which fluid may flow from said inlet chamber to said intermediate chamber; a second choke means through which fluid may flow from said intermediate chamber to said outlet chamber; a plurality of valves respectively controlling the flow of fluid through a corresponding one of said plurality of choke means; means under the control of the operator of the vehicle for causing operation of one or more of said valves whereby to selectively control the collective flow capacity of said plurality of choke means; said plurality of choke means and said second choke means cooperating according to the relative flow capacities thereof to cause corresponding different pressures to be established in said intermediate chamber which pressure is effective on said abutment to control the degree of application and the release of the brakes; valve means effective upon operation to establish a communication between said intermediate chamber and said outlet chamber whereby to effect a rapid reduction of the pressure in said intermediate chamber to thereby effect a rapid reduction in the degree of application of the brakes, and means responsive to slipping of the wheel of the vehicle on which the brakes are applied for effecting operation of said valve means.

CLAUDE M. HINES.
DOUGLAS R. BORST.